(12) United States Patent
Alden, Sr.

(10) Patent No.: US 7,344,174 B2
(45) Date of Patent: Mar. 18, 2008

(54) APPARATUS FOR REMOVING AND INSERTING OPTICALLY READ DISKS

(76) Inventor: Jeffrey S. Alden, Sr., 27 Deseret Dr., Bourne, MA (US) 02532

( * ) Notice: Subject to any disclaimer, the term of this patent is extended or adjusted under 35 U.S.C. 154(b) by 0 days.

(21) Appl. No.: 11/239,826

(22) Filed: Sep. 30, 2005

(65) Prior Publication Data

US 2007/0075556 A1 Apr. 5, 2007

(51) Int. Cl.
*B25B 9/02* (2006.01)

(52) U.S. Cl. .......................... 294/93; 294/100

(58) Field of Classification Search .............. 294/93, 294/94, 96, 100, 99.2, 95, 902, 19.1; 81/444; 29/764

See application file for complete search history.

(56) References Cited

U.S. PATENT DOCUMENTS

| | | | |
|---|---|---|---|
| 1,600,649 A * | 9/1926 | Basini | 294/100 |
| 2,752,625 A * | 7/1956 | Ponsell | 294/100 |
| 4,283,082 A * | 8/1981 | Tracy | 294/93 |
| 4,377,956 A * | 3/1983 | Cooper | 294/95 |
| 5,195,794 A * | 3/1993 | Hummel et al. | 294/94 |
| 5,503,446 A * | 4/1996 | De Jong | 294/94 |
| 5,713,618 A * | 2/1998 | Kocsis | 294/93 |
| 6,591,739 B2 * | 7/2003 | Norcross | 294/55.5 |

\* cited by examiner

*Primary Examiner*—Peter M. Cuomo
*Assistant Examiner*—Paul T Chin
(74) *Attorney, Agent, or Firm*—Raymond A. Galasso; Galasso & Associates, LP

(57) ABSTRACT

A gripping apparatus is provided that enables users to insert and remove optically read disks without touching them by hand. The apparatus comprises a hollow frame and a spring-loaded plunger with flexible hooks. When the plunger is pushed down out of the locked position, protrusions on the hooks are forced out of convex indentations and against the inner sides of the frame, compressing the hooks. The apparatus can then be inserted through the central hole in a disk. The user then releases the plunger, which is forced upward by a compressed spring so that the protrusions on the hooks fit back into the indentations. The hooks then expand outward so that the disk is held securely and may be removed from its storage case or a player. Reversing this operation allows a user to insert a disk into a storage case or player.

5 Claims, 2 Drawing Sheets

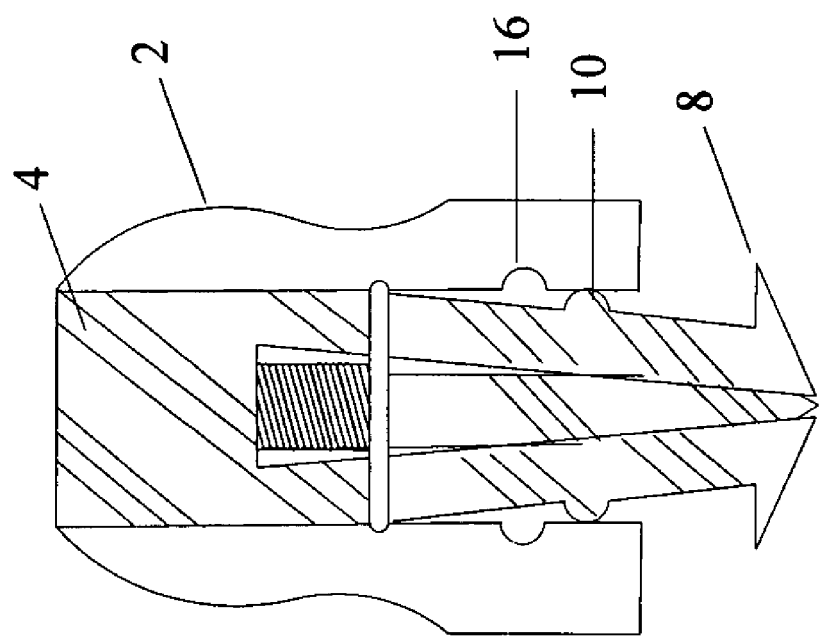
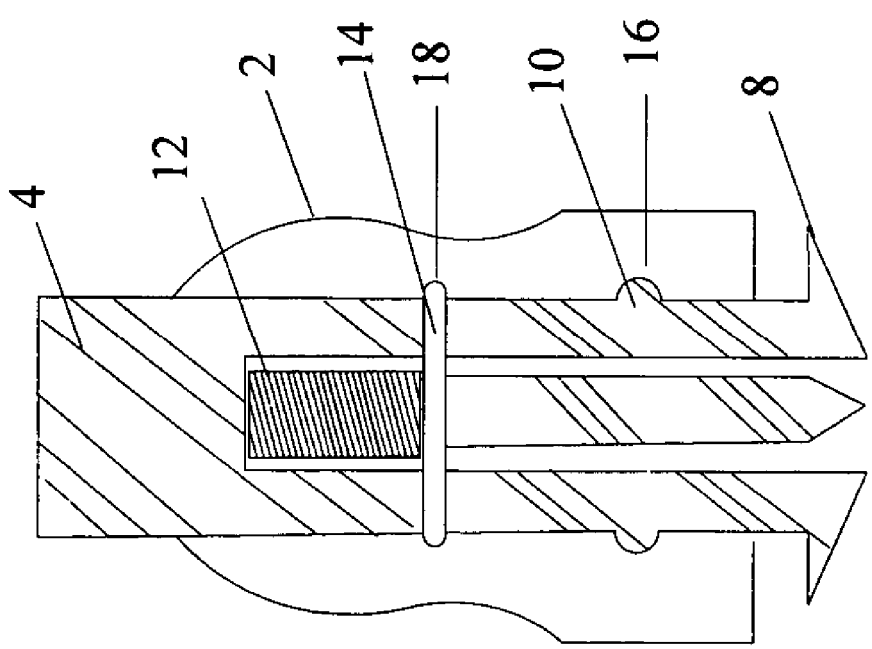

APPARATUS FOR REMOVING AND INSERTING OPTICALLY READ DISKS

FIELD OF THE DISCLOSURE

This invention relates to an apparatus for removing and inserting optically read disks, for example, compact disks (CDs) and digital video disks (DVDs), out of and into protective cases and players.

BACKGROUND

Optically read disks such as compact disks (CDs) and digital video disks (DVDs) are popular storage devices for audio, graphic, and video media. These disks store information digitally and are typically read by optical readers through laser technology. One of the challenges associated with these disks is the need to keep them clean. Finger smudges, dust particles, other foreign materials, and scratches on the surfaces of these disks may cause optical distortions when the disks are read that can result in loss of quality.

Consequently, users of CDs and DVDs must take great care when handling them. When removing CDs and DVDs from their storage cases, for example, they must be careful to hold them by their edges. This is often an awkward procedure, since CDs and DVDs are typically held in place in their storage cases by snapping over circular retaining clips with flexible members in the centers of the cases. It is sometimes difficult to remove CDs and DVDs from these clips without more firmly grasping the disks on the flat top and bottom sides, which can leave finger smudges, dust, and scratches on their surfaces. CDs and DVDs can also be dropped and will sometimes even break during removal when held solely by their edges. Moreover, placing CDs and DVDs in players and removing them subsequently while holding them by their edges is also awkward and difficult.

Therefore, there is a need for an apparatus that enables optically read disks to be inserted into and removed from devices without marring the surfaces of the disks.

SUMMARY OF THE DISCLOSURE

The following explanation describes the present invention by way of example and not by way of limitation.

It is an aspect of the present invention to provide an apparatus that enables optically read disks to be inserted into and removed from devices without marring the surfaces of the disks.

It is another aspect of the present invention to provide an apparatus for inserting and removing optically read disks that is simple in design and thus inexpensive to manufacture and purchase.

These and other aspects of the present invention will become readily apparent upon further review of the following specification and associated drawings. In accordance with the present invention, an apparatus is provided that enables users to insert and remove optically read disks without touching them by hand. The apparatus comprises a hollow frame and a spring-loaded plunger with flexible hooks. When the plunger is pushed down out of the locked position, protrusions on the hooks are forced out of convex indentations and against the inner sides of the frame, compressing the hooks. The apparatus can then be inserted through the central hole in a disk. The user then releases the plunger, which is forced upward by a compressed spring so that the protrusions on the hooks fit back into the indentations. The hooks then expand outward so that the disk is held securely and may be removed from its storage case or a player. Reversing this operation allows a user to insert a disk into a storage case or player.

BRIEF DESCRIPTION OF THE DRAWINGS

The following embodiments of the present invention are described by way of example only, with reference to the accompanying drawings, in which:

FIG. 2A is schematic diagram that illustrates a side view of an apparatus for inserting and removing optically read disks, in the locked position; and FIG. 2B is schematic diagram that illustrates a side view of an apparatus for inserting and removing optically read disks, in the extended position.

DETAILED DESCRIPTION OF THE DRAWING FIGURES

The following description of drawings is offered to illustrate the present invention clearly. However, it will be apparent to those skilled in the art that the concepts of the present invention are not limited to these specific details. Also, commonly known elements are shown in diagrams for clarity, as examples only and not as limitations of the present invention.

The present invention comprises a hand-held apparatus for inserting, removing, and otherwise manipulating optically read disks. In an embodiment, the apparatus may be manufactured of lightweight, durable materials, for example plastic, rubber, and metal.

Figure 1C:
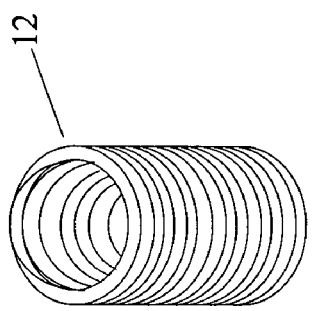
FIG. 1C is schematic diagram that illustrates a side view of a spring for an apparatus for inserting and removing optically read disks.
Figure 1D:
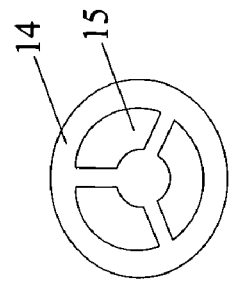
FIG. 1D is schematic diagram that illustrates a side view of a spring base for an apparatus for inserting and removing optically read disks.
Figure 1B:
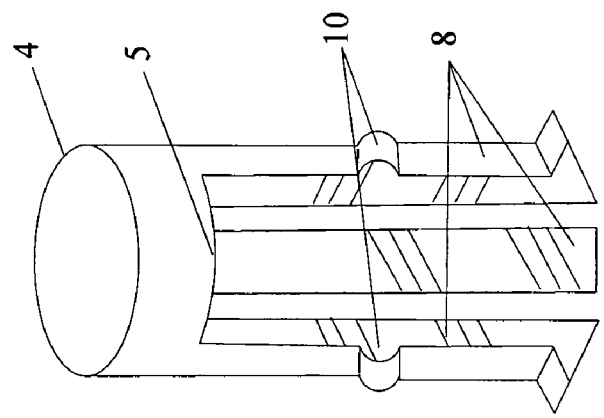
FIG. 1B is schematic diagram that illustrates a side view of a plunger for an apparatus for inserting and removing optically read disks.
Figure 1A:
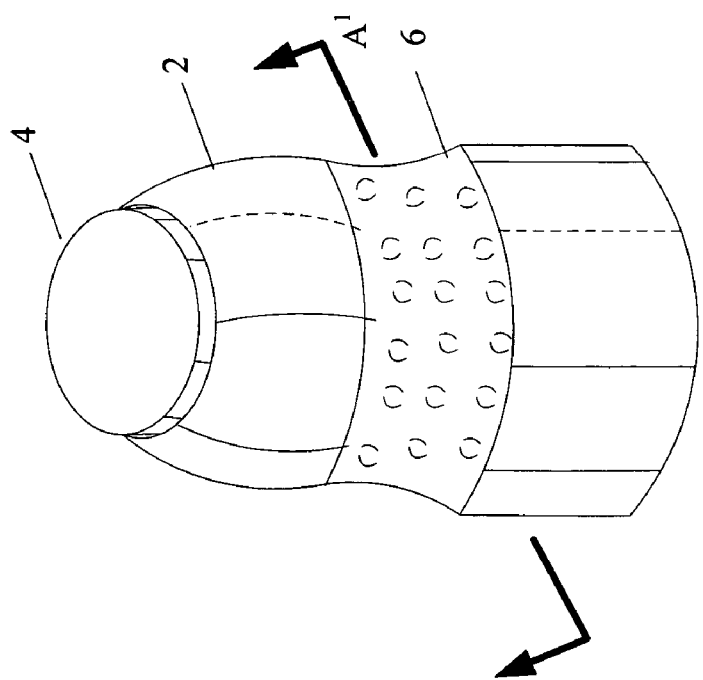
FIG. 1A is a schematic diagram that illustrates a side view of an apparatus for inserting and removing optically read disks.

An embodiment of the apparatus comprises the following elements:

A frame 2, shown in FIG. 1A;

A plunger 4, shown in FIG. 2A;

A dimpled grip 6 on the frame 2, shown in FIG. 1A;

Hooks 8, shown in FIG. 1B;

Convex protrusions 10 on the hooks 8, shown in FIG. 1B;

A spring 12, shown in FIG. 1C;

A spring base 14, shown in FIG. 1D;

Concave indentations 16 in the inside of the frame 2, shown in FIG. 2A, designed to fit the convex protrusions 10 on the hooks 8, shown in FIG. 1B; and Concave indentations 18 in the inside of the frame 2, shown in FIG. 2A, designed to fit the spring base 14, shown in FIG. 1D.

A hollow frame 2, shown in FIG. 1A, serves to contain the other elements of the apparatus and to allow users to easily hold and employ the apparatus by hand. In an embodiment, the frame 2 may be manufactured of plastic.

In an embodiment, a dimpled grip 6 on the frame 2 makes the apparatus particularly easy to hold. The grip 6 may be manufactured of rubber in an embodiment.

A spring-operated plunger 4 extends through the top of the frame 2. Users can push the plunger 4 down into the frame 2 with their thumbs or fingers. As shown in FIG. 2B, the plunger 4 comprises flexible hooks 8. In an embodiment, three hooks 8 may be used, as shown in FIG. 1B. Each hook comprises a convex protrusion 10. In an embodiment, the plunger 4 may be manufactured of plastic.

A spring 12, shown in FIG. 1C, fits into the center of the plunger 4, shown in FIG. 1B, within the hooks 8. In an embodiment, a metal spring 12 may be used. The spring 12 is placed in between the top underside 5 of the plunger 4 and a spring base 14, shown in FIG. 1D. The spring base 14 fits into concave indentations 18 in the inside of the frame 2, shown in FIG. 2A. The hooks 8, shown in FIG. 1B, of the plunger 4 pass through openings 15, shown in FIG. 1D, in the surface of the spring base 14.

The plunger 4 is thus spring-operated. Pushing down on the plunger 4 forces it deeper into the frame 2, compressing the spring 12 against the spring plate 14. When the plunger 4 is released, the force of the compressed spring 12 pushes the plunger 4 upward.

The insides of the frame 2, shown in FIG. 2A, comprise concave indentations 16 designed to hold the convex protrusions 10 on the hooks 8. In the locked position shown in FIG. 2A, the flexible hooks 8, the convex protrusions 10 of which are within the concave indentations 16, are at their maximum outward extension.

When the plunger 4 is pushed downward, as shown in FIG. 2B, the convex protrusions 10 on the plunger 4 are forced out of the concave indentations 16 on the frame 2, so that the protrusions 10 push against the sides of the frame 2, compressing the hooks 8 together.

When the plunger 4 is subsequently released and the spring forces it upward, the protrusions 10 fits again into the indentations 16, so that the hooks 8 expand outward.

In an embodiment, the apparatus would measure approximately two inches in height and one and one and one half inches in width. The best dimensional relationships for the parts of the invention described above, including variations in form and use, will be readily apparent to those skilled in the art, and are intended to be encompassed by the present invention.

Use

A user holds the apparatus over the central hole in an optically read disk in a storage case and pushes down the plunger 4, as shown in FIG. 2B. This compresses the hooks 8, so that the user can insert the apparatus through the flexible members of the retaining clip in the storage case and through the hole in the disk. The user then releases the plunger 4, as shown in FIG. 2A, which expands the hooks 8 so that they lock into position wide enough to hold the disk. Enough space is left between the bottom of the frame 2 and the flanges of the hooks 8 so that the disk fits there securely. The user can then pull the disk out of the storage case, place the disk inside a player, press the plunger 4 again, and pull the apparatus out of the disk.

After the disk has played, the user can re-insert the apparatus into the disk, remove the disk from the player, re-insert the disk into its storage case, and remove the apparatus from the disk.

None of the user's actions require touching the disk by hand, so that manipulating the disk can be done with much less risk of marring its surface.

What is claimed is:

1. A hand-held apparatus for inserting, removing, and otherwise manipulating optically read disks, the apparatus comprising
   a hollow frame wherein said frame comprises a first concave indentation on the inside of said frame which holds a spring base in place; and
   a plunger, the plunger comprising
      flexible hooks, such that the hooks can be compressed and released to capture an optically read disk and allow it to be lifted, each hook comprising
         a convex protrusion, such that the protrusion fits into a second concave indentation on the inside of the frame; and
         a top underside, such that a spring can be compressed against the top underside;
   a spring base, such that
      the hooks of the plunger extend through holes in the spring base; and
      a spring which fits within the hooks of the plunger and can be compressed against surfaces
   between the top underside of the plunger and the spring base.

2. The frame of claim 1, wherein the frame comprises a dimpled grip.

3. The grip of claim 2, wherein the grip is manufactured of rubber.

4. A hand-held apparatus for inserting, removing, and otherwise manipulating optically read disks, the apparatus comprising
   a hollow frame wherein said frame comprises a first concave indentation on the inside of said frame, which holds a spring base in place; and
   a dimpled rubber grip,
   a plunger, the plunger comprising
      three flexible hooks, such that the hooks can be compressed and released to capture an optically read disk and allow it to be lifted, each hook comprising
         a convex protrusion, such that the protrusion fits into a second concave indentation on the inside of the frame; and
         a top underside, such that a spring can be compressed against the top underside;
   a spring base, such that
      the hooks of the plunger extend through holes in the spring base;
      a spring which fits within the hooks of the plunger and can be compressed against surfaces
   between the top underside of the plunger and the spring base.

5. A hand-held apparatus, measuring two inches in height and one and one half inches in diameter, for inserting, removing, and otherwise manipulating optically read disks, the apparatus comprising
   a hollow frame wherein said frame comprises a first concave indentation on the inside of said frame which holds a spring base in place; and
   a dimpled rubber grip,
   a plunger, the plunger comprising
      three flexible hooks, such that the hooks can be compressed and released to capture an optically read disk and allow it to be lifted, each hook comprising
         a convex protrusion, such that the protrusion fits into a second concave indentation on the inside of the frame; and a top underside, such that a spring can be compressed against the top underside;

a spring base, such that
the hooks of the plunger extend through holes in the spring base;

a spring which fits within the hooks of the plunger and can be compressed against surfaces between the top underside of the plunger and the spring base.

* * * * *